United States Patent
Pishvaibazargani et al.

(10) Patent No.: US 12,228,808 B2
(45) Date of Patent: Feb. 18, 2025

(54) SEMICONDUCTOR-BASED OPTICAL MODULATOR

(71) Applicant: Marvell Asia Pte Ltd, Singapore (SG)

(72) Inventors: Hamed Pishvaibazargani, Stittsville (CA); Masaki Kato, Palo Alto, CA (US)

(73) Assignee: Marvell Asia Pte Ltd, Singapore (SG)

( * ) Notice: Subject to any disclaimer, the term of this patent is extended or adjusted under 35 U.S.C. 154(b) by 121 days.

(21) Appl. No.: 17/733,587

(22) Filed: Apr. 29, 2022

(65) Prior Publication Data

US 2022/0350179 A1    Nov. 3, 2022

Related U.S. Application Data

(60) Provisional application No. 63/182,436, filed on Apr. 30, 2021.

(51) Int. Cl.
  *G02F 1/015*  (2006.01)
  *G02F 1/025*  (2006.01)
  *G02F 1/21*   (2006.01)

(52) U.S. Cl.
  CPC ............ *G02F 1/025* (2013.01); *G02F 1/0151* (2021.01); *G02F 1/212* (2021.01)

(58) Field of Classification Search
  None
  See application file for complete search history.

(56) References Cited

U.S. PATENT DOCUMENTS

| | | | |
|---|---|---|---|
| 6,298,177 B1 | 10/2001 | House | |
| 10,241,354 B1 | 3/2019 | Gill | |
| 10,627,655 B2 | 4/2020 | Huang et al. | |
| 10,866,440 B1 | 12/2020 | Cho et al. | |
| 2006/0008223 A1 | 1/2006 | Gunn et al. | |
| 2008/0159680 A1 | 7/2008 | Gill | |
| 2009/0263078 A1 | 10/2009 | Hosomi et al. | |
| 2014/0376852 A1 | 12/2014 | Manouvrier | |
| 2016/0299363 A1 | 10/2016 | Wei et al. | |
| 2018/0239176 A1 | 8/2018 | Tsuzuki et al. | |

(Continued)

FOREIGN PATENT DOCUMENTS

GB    2588284 A    4/2021

OTHER PUBLICATIONS

D. Patel et al, Design, analysis, and transmission system performance of a 41GHz silicon photonic modulator. Opt. Express. vol. 23, No. 11, 2015.

(Continued)

*Primary Examiner* — Chad H Smith

(57) ABSTRACT

An optical modulator includes, a semiconductor substrate, an optical waveguide portion disposed on the semiconductor substrate, a first P-N junction disposed on the semiconductor substrate, and a second P-N disposed on the semiconductor substrate. The optical waveguide portion provides an optical path for light that is to be modulated. The first P-N junction is disposed on the semiconductor substrate along the optical path and defines a border between an N-doped portion disposed on the semiconductor substrate and a P-doped portion disposed on the semiconductor substrate. The second P-N junction is disposed on a portion of the semiconductor substrate alongside the optical path and spaced apart from the first P-N junction.

25 Claims, 9 Drawing Sheets

(56) References Cited

U.S. PATENT DOCUMENTS

| 2020/0124883 | A1 | 4/2020 | Deslie-Simard et al. |
| 2020/0363665 | A1* | 11/2020 | Latrasse ............... G02F 1/2257 |
| 2021/0072614 | A1* | 3/2021 | Yoo ..................... G02F 1/2257 |
| 2021/0231866 | A1 | 7/2021 | Tu et al. |
| 2022/0026747 | A1 | 1/2022 | Chen |

OTHER PUBLICATIONS

J. Zhou et al., Silicon Photonics for 100Gbaud, Journal of Lightwave Technology vol. 39, No. 4, 2021. Abstract only.
K. Padmaraju et al., Resolving the thermal challenges for silicon microring resonator devices. Nanophotonics.vol. 3, No. 4-5, 2014.
X. Zheng et al., A high high-speed tunable silicon photonic ring modulator integrated with ultra ultra-efficient active wavelength control, Opt. Express. vol. 22, No. 10, 2014.
P. O. Weigel et al, Bonded thin film lithium niobite modulator on a silicon photonics platform exceeding 100GHz 3-dB electrical modulation bandwidth, Opt. Express. vol. 26, No. 18, 2018.
PV Lighthouse website of online resources for photovoltaic (PV) engineers and scientists.https://www.pvlighthouse.com.au/resistivity, Feb. 2021-Apr. 2022.
T. Baehr-Jones et al., A 25GB/s Silicon Photonics Platform, arXiv preprint arXiv:1203.0767, 2012.
U.S. Appl. No. 17/113,463, filed Dec. 7, 2020.
U.S. Appl. No. 17/119,429, filed Dec. 11, 2020.
International Search Report and Written Opinion for PCT/US/2022/026976, mailed Aug. 10, 2022 (13 pages).

* cited by examiner

SEMICONDUCTOR-BASED OPTICAL MODULATOR

PRIORITY

This application claims the benefit of U.S. provisional application entitled "NPN-BASED SILICON PHOTONICS MODULATOR DESIGN," filed Apr. 30, 2021, bearing, and assigned Ser. No. 63/182,436, the entire disclosure of which is hereby expressly incorporated by reference.

BACKGROUND

Technical Field

The disclosure relates generally to optical modulators, and more particularly to semiconductor based optical modulators.

Brief Description of Related Technology

During this time of growth of Internet technologies and usage, demand for high speed data transmission has increased rapidly. As an example, average internet traffic in 2021 was estimated to exceed 700 terabytes per second. Technologies to support such sustained usage levels will continue to proliferate. Optical transmission of data can support vast amounts of data per channel—often limited more by the rate at which electronics can encode a signal onto the optical channel rather than the bandwidth of the channel itself. Improvements to optical modulation performance will continue to drive adoption of such technologies.

SUMMARY

Figure 1:
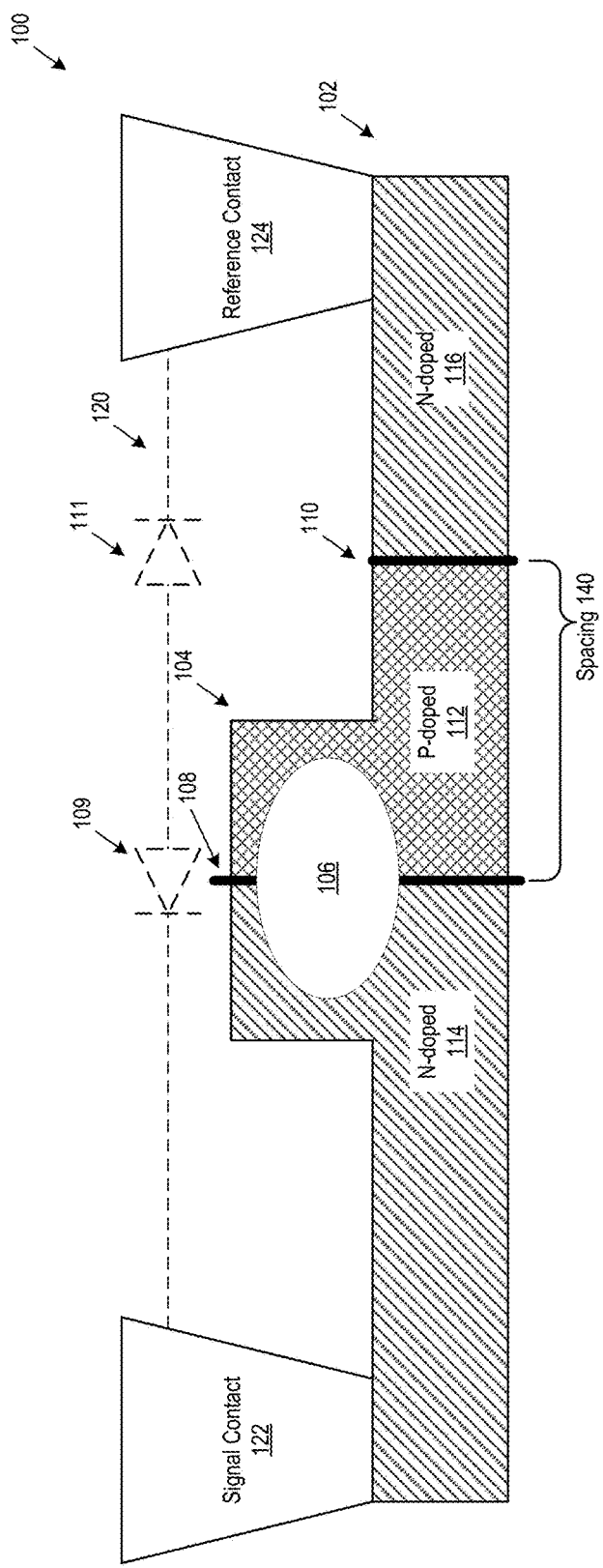
FIG. 1 shows a cross-sectional view of an example semiconductor based optical modulator.

In an implementation, an optical modulator includes: a semiconductor substrate; an optical waveguide portion disposed on the semiconductor substrate, the optical waveguide portion configured to provide an optical path for light that is to be modulated; a first P-N junction disposed on the semiconductor substrate along the optical path, the first P-N junction defining a border between an N-doped portion disposed on the semiconductor substrate and a P-doped portion disposed on the semiconductor substrate; and a second P-N junction disposed on a portion of the semiconductor substrate alongside the optical path and spaced apart from the first P-N junction.

In an implementation, a method of optical modulation includes: optically coupling light to be modulated onto an optical path provided by an optical waveguide portion disposed on a semiconductor substrate; and electrically coupling a modulation signal along an electrical path by: electrically coupling across a first P-N junction disposed on the semiconductor substrate along the optical path and that defines a border between a N-doped portion disposed on the semiconductor substrate and a P-doped portion disposed on the semiconductor substrate; and electrically coupling across a second P-N junction disposed on the semiconductor substrate alongside the optical path and spaced apart from the first P-N junction.

In an implementation, a method of manufacturing an optical modulator includes: providing a semiconductor substrate; fabricating an optical waveguide portion disposed on the semiconductor substrate, the optical waveguide portion configured to provide an optical path for light that is to be modulated; fabricating a first P-N junction disposed on the semiconductor substrate along the optical path, the first P-N junction defining a border between an N-doped portion disposed on the semiconductor substrate and a P-doped portion disposed on the semiconductor substrate; and fabricating a second P-N junction disposed on a portion of the semiconductor substrate alongside the optical path and spaced apart from the first P-N junction.

DETAILED DESCRIPTION

In various contexts, optical modulators encode electromagnetic modulation signals onto light signals. In some cases, one or more radio-frequency (RF) signals, e.g., potentially aggregated from multiple sources, provide the to-be encoded modulation signals. An optical modulator receives the RF signals and unencoded light as inputs and produces light with the RF signal encoded thereon as an output. An example of a type of optical modulator is an optical modulator that splits coherent source light in two portions, phase shifts at least one of the portions in accordance with the RF signal to be encoded, and then recombines the portions to create an interference effect that encodes the RF signal into the intensity profile of the output light. Ring modulators, which impart the phase shift in a ring coupled to an input/output channel, are one example. Another example is a Mach-Zehnder modulator (MZM) that splits input light into two arms and then recombines the light after phase shifting light passing through (at least) one of the arms.

In various example semiconductor-based systems (using both ring and MZM formats), the phase shift is imparted by passing light through an optical waveguide coincident with a P-N junction that extends down the optical path of the optical waveguide. The RF signal is electrically coupled across the P-N junction, e.g., from an input contact to a DC reference point, to impart the phase shift on the passing light. In some cases, the bandwidth capacity of such semiconductor-based modulators is dependent on the electrical performance of the semiconductor device, e.g., the ability of the device to handle high frequency, 1-100 gigahertz or higher frequency, RF signals. In some cases, factors such as resistivity and/or capacitance over an electrical path cause frequency-dependent losses over the electrical path. In some cases, those losses increase with the frequency of the signal.

In an illustrative example semiconductor-based optical modulator with a single P-N junction (e.g., the P-N junction coincident with the optical waveguide) on the electrical path between the input contact to the DC reference point, the single P-N junction defines a border between one N-doped portion and one P-doped portion. In other words, a P-N junction defines a border between opposingly-doped portions. In this illustrative example, to avoid the comparatively high resistance of un-doped semiconductor substrate, the entire electrical path is either P-doped or N-doped. Thus, in this illustrative example, without additional P-N junctions, the one N-doped region and one P-doped region is the most the example optical modulator supports.

Due to their structure, P-N junctions contribute capacitance. Further, because the loss contributions due to capacitance grow quadratically with RF signal frequency, conventional wisdom has held that only P-N junctions used to effect an optical phase shift should be included in the electrical path and that other P-N junctions are to be avoided. Nevertheless, the resistivity of P-doped regions is higher than that of N-doped regions with similar dopant levels. Accordingly, although contrary to conventional wisdom, inventors have found that an optical modulator with an electrical path including multiple P-N junctions has the potential to reduce overall RF signal losses. Moreover, by increasing the N-doped path length relative to P-doped path length, resistivity can be reduced silicon as to overcome additional contribution to RF-signal loss from capacitance.

Referring now to FIG. 1, a cross-sectional view of an example semiconductor based optical modulator 100 is shown. The example optical modulator 100 includes a semiconductor substrate 102. An optical waveguide 104 is disposed on the substrate 102. The optical waveguide 104 is structured to guide light in one or more optical modes 106 on an optical path (going into the page). A first P-N junction (e.g., an "on-path" P-N junction) 108 is coincident with the optical waveguide 104. In other words, the on-path P-N junction is on the optical path. The on-path P-N junction 108 defines a border between the P-doped portion 112 on the substrate 102 and a first N-doped portion 114 on the substrate.

When exposed to a change in electrical potential, the P-doped portion 112 and the first N-doped portion 114 undergo different changes in their respective refractive indices. In other words, a change in electrical potential results in relative change in refractive index between the P-doped portion 112 and the first N-doped portion 114. Accordingly, when exposed to an RF signal, the relative refractive index of the P-doped portion 112 and the first N-doped portion 114 is dependent on the changing E-field of the RF-signal. Because the one or more optical modes 106 straddle the on-path P-N junction 108, any relative index difference of the causes the phase of the optical modes 106 to process. Refractive index is the inverse of phase velocity. Therefore the relative index causes the portion of the optical mode 106 overlapping the P-doped portion 112 to have a different phase velocity than the portion of the optical mode overlapping the first N-doped portion 114. Further, because the relative index is controlled by the input RF-signal, the resultant phase shift for the optical mode 106 also is dependent on the RF signal. When recombined and interfered with the other split coherent light, the time-dependent intensity of the interfered modulated output light depends on the time-dependent intensity of the E-field of the RF-signal.

In various implementations, the relative refractive index shifts of P-doped and N-doped materials arises out of free-carrier effects such as plasma dispersion effects and photon-absorption effects.

A second P-N junction (e.g., an "off-path" P-N junction) 110 is spaced apart from the optical waveguide 104 and the on-path P-N junction 108. In other words, the off-path P-N junction 110 is off the optical path. The off-path P-N junction 110 defines a border between the P-doped portion 112 and a second N-doped portion 116 disposed on the substrate 102. Together, the on-path P-N junction 108 and the off-path P-N junction 110 form an "NPN" modulator, where a P-doped portion is positioned between two N-doped portions.

In the example, the on-path P-N junction 108 and off-path P-N junction 110 are laterally spaced apart and have the same spatial orientation with respect to the semiconductor substrate 102. However, in other implementations, the on-path P-N junction 108 and off-path P-N junction 110 are horizontally spaced apart and/or spaced apart both horizontally and laterally. In some implementations, the on-path P-N junction 108 and off-path P-N junction 110 have different orientations with respect to the semiconductor substrate 102. For example, in some cases, the off-path P-N junction 110 is horizontal with respect to the substrate while the on path P-N junction 108 vertical with respect to the substrate.

The on-path P-N junction 108 and off-path P-N junction 110 are spaced apart such that at least two non-contiguous same-doped portions are created within the example semiconductor based optical modulator 100. Thus, regardless of the relative orientations of the on-path P-N junction 108 and off-path P-N junction 110, the P-N junctions 108, 110 create at least two non-contiguous same-doped portions that do not touch one another. Rather these two non-contiguous same-doped portions are separated by at least one opposingly-doped portion which, in some cases, provides electrical coupling between the two non-contiguous same-doped portions. In the example semiconductor based optical modulator 100, two non-contiguous N-doped portions 114, 116 are present. The two non-contiguous N-doped portions 114, 116 are separated by the P-doped portion 112. The P-doped portion provides electrical coupling between the two non-contiguous N-doped portions 114, 116.

In the example, the spacing 140 between the on path 108 and off path 110 P-N junctions is selected to avoid interference between the optical modes 106 and the off-path P-N junction 110. In an example, the spacing 140 is selected based on the size of the optical mode 106. In an example, the spacing 140 is selected to balance a ratio of electrical losses associated with comparatively increased device resistance associated with a longer P-doped portion 112 to optical losses associated with optical absorption (e.g., free carrier absorption effects, or other absorption effects) caused by the off-path P-N junction 110.

In various implementations, the size of the optical mode 106 is characterized using various measures of the optical intensity profile of the optical mode. For example, in some cases, the optical mode 106 is approximated as circular and characterized by a radius. For example, in some cases, the optical mode 106 is approximated as elliptical and characterized by a minor and major axis. For example, in some cases, the optical mode 106 is simulated using one of various electro-magnetic field simulation software packages.

The loss contribution of the off-path P-N junction 110 depends on the E-field distribution of the optical mode and the overlap between the E-field distribution and the off-path P-N junction 110. In some implementations relying on simulation, the loss effects of the off-path P-N junction 110 are simulated in addition to the optical mode 106 simulation. In various implementations, the loss contributions of the off-path P-N junction 110 are characterized empirically, by testing systems with varying spacings 140. Various implementations, are characterized using a combination of mode distribution estimation, mode distribution simulation, and/or empirical characterization of the mode distribution.

The example optical modulator 100 includes a signal contact 122 and a DC (direct current) reference contact 124. In the example optical modulator 100, the contacts 122, 124 are metal contacts. However, other conductive materials are used in other implementations. The signal contact 122 is used to supply an RF signal input that traverses an electrical path 120 across the cross-section to the DC reference contact 124. The DC reference contact 124 is used as a DC reference point (e.g., set at ground, a selected bias level, or other DC reference level).

In the example optical modulator 100, the electrical path 120 traverses the comparatively longer combined length of the two N-doped portions 114, 116, the comparatively shorter length of P-doped portion 112, the on-path P-N junction 108, and the off-path P-N junction 110. In view of an inherent property of silicon being that i) an increase in the length of P-doped portions causes increased resistance along the electrical path 120, and ii) that P-N junctions contribute to added capacitance, a technical implementation design goal as disclosed herein is to sufficiently reduce resistivity by reducing P-doped portion electrical path length to outweigh additional contributions to capacitance resulting from inclusion of the off-path P-N junction 110.

As an unexpected result, the comparative RF bandwidth performance of various optical modulators including such off-path P-N junctions improves beyond the expected gains from the reduction in resistivity from reduced P-doped electrical path length. In some cases, the bandwidth performance gains from the inclusion of off-path P-N junctions is large enough to render resistivity a secondary concern. Thus, various example modulators using the off-path P-N junction to include two P-doped portions along electrical path length to form a "PNP" modulator.

Figure 2:
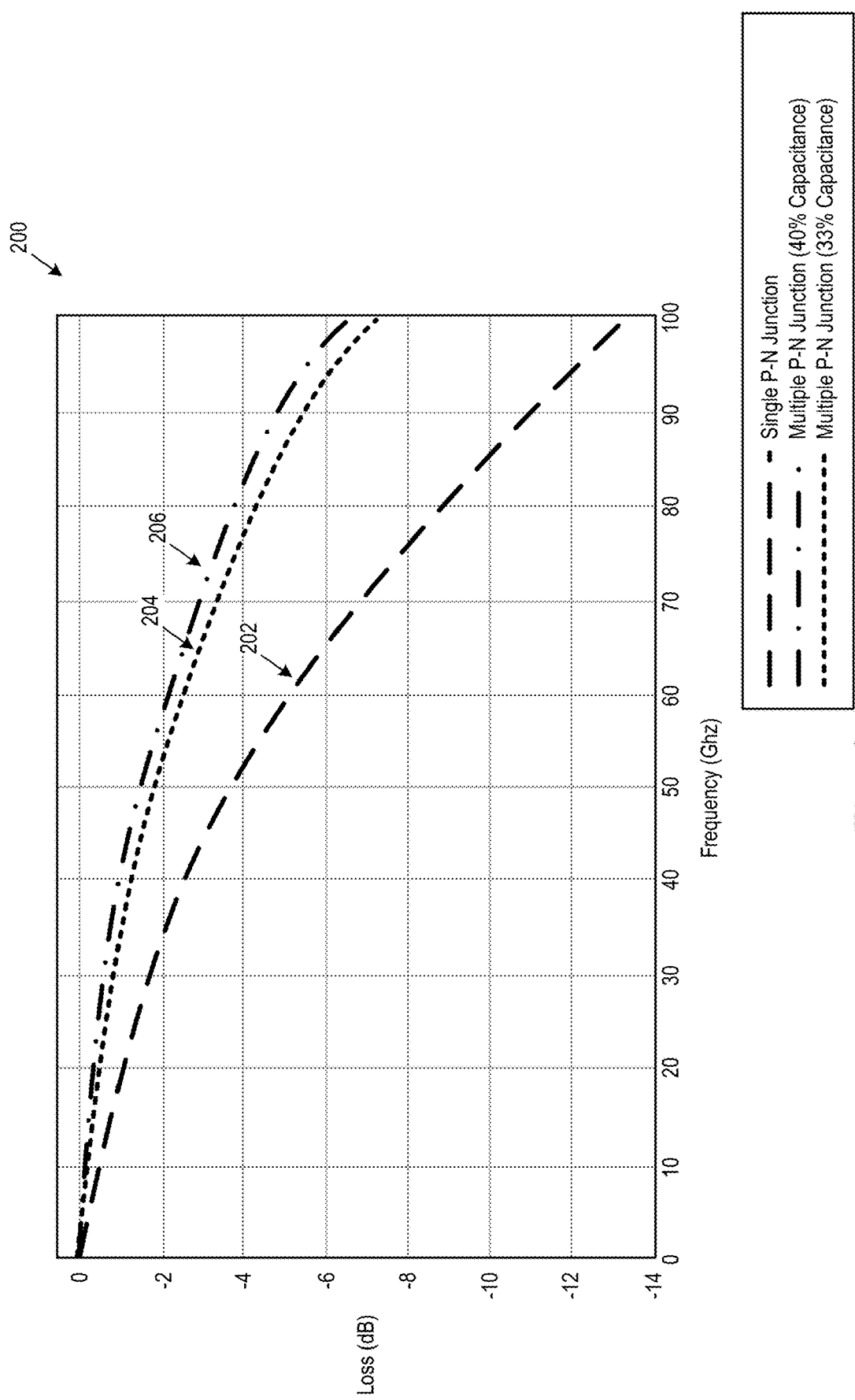
FIG. 2 shows a plot of loss versus signal frequency for example semiconductor-based optical modulators.

FIG. 2 shows a plot 200 of loss versus RF frequency for example semiconductor-based optical modulators. The electro-optical loss 202 measured for the example single P-N junction modulator becomes increasingly pronounced relative to the electro-optical losses 204, 206 measured for two example multiple P-N junction modulators as frequency is increased. Accordingly, the example modulators with multiple P-N junctions have a greater operational bandwidth than the example single P-N junction modulator. An optical modulator with a wider operating bandwidth supports systems that handle greater levels of data traffic with the same number of modulators (and similar material costs) as lower performing systems.

Referring again to FIG. 1, the observed results are explained through analysis of the interrelation of the on-path P-N junction 108 and the off-path P-N junction 110. Rather than independently contributing to loss in RF signals traversing the electrical path 120, the on-path P-N junction 108 and the off-path P-N junction 110 behave in the aggregate as series capacitors. Accordingly, a relevant measure of capacitance for the purposes of RF signal loss becomes the series capacitance of the on-path P-N junction 108 and the off-path P-N junction 110. The series capacitance ($C_{NPN}$, e.g., the capacitance of the whole NPN structure) of the on-path P-N junction 108 and the off-path P-N junction 110 is lower than the individual capacitance of either one in isolation (e.g., $C_{on\text{-}path}$ or $C_{off\text{-}path}$).

Because the off-path P-N junction 110 makes the opposite transition (e.g., from P-doped to N-doped going from left to right) of the on-path P-N junction (e.g., from N-doped to P-doped going from left to right), the off-path P-N junction 110 is modelled as a capacitive diode 111 that is opposingly oriented to and in series with the capacitive diode 109 of the on-path P-N junction 108. The series capacitance, $C_{NPN}$, is:

$$C_{NPN} = \frac{C_{on\text{-}path} C_{off\text{-}path}}{C_{on\text{-}path} + C_{off\text{-}path}} \qquad \text{eq. 1}$$

In various other implementations, two or more off-path P-N junctions are included in the electrical path.

Applying higher values of reverse bias on a P-N junction increases depletion width for that P-N junction. This results in a reduction of in the capacitance contribution of that P-N junction. However, because successive P-N junctions make opposing transitions, a reverse bias for one P-N junction serves as a forward bias for any neighboring P-N junctions. In some cases, the total number of P-N junctions in the electrical path is selected based on a ratio of gain in modulator bandwidth due to capacitance reductions to electrical losses due to the presence of forward biased P-N junctions.

In some implementations with one or more off-path P-N junctions, no bias is applied to the electrical path to avoid creation of forward biased P-N junctions.

In some examples, a forward-biased on-path P-N junction reduces the signal voltage level used to achieve a 180 degree relative phase shift between split portions the input light. Accordingly, use of a forward-biased on-path P-N junction increases operational efficiency. However, as discussed above, the presence of forward-biased P-N junctions reduces operational bandwidth. Accordingly, some implementations balance the use of a forward-biased on-path P-N junction for electrical efficiency with the operational bandwidth loss associated with such usage. In some cases, the operational bandwidth gains from the inclusion of one or more off-path P-N junctions are used to offset bandwidth losses associated with usage of forward-biased P-N junctions. Thus, the benefits of off-path P-N junctions are realized (at least in part) in increased power consumption efficiency instead of increased operational bandwidth.

In various implementations, semiconductor based optical modulators with one or more off-path P-N junctions are implemented using II-IV semiconductor platforms. For example, in some cases, the semiconductor based optical modulator is implemented on a polysilicon chip.

In various implementations, semiconductor based optical modulators with one or more off-path P-N junctions are implemented using III-V semiconductor platforms. For example, in some cases, the semiconductor based optical modulator is implemented using Gallium Arsenide, Gallium Nitride, and/or other III-V semiconductor materials.

Figure 3:
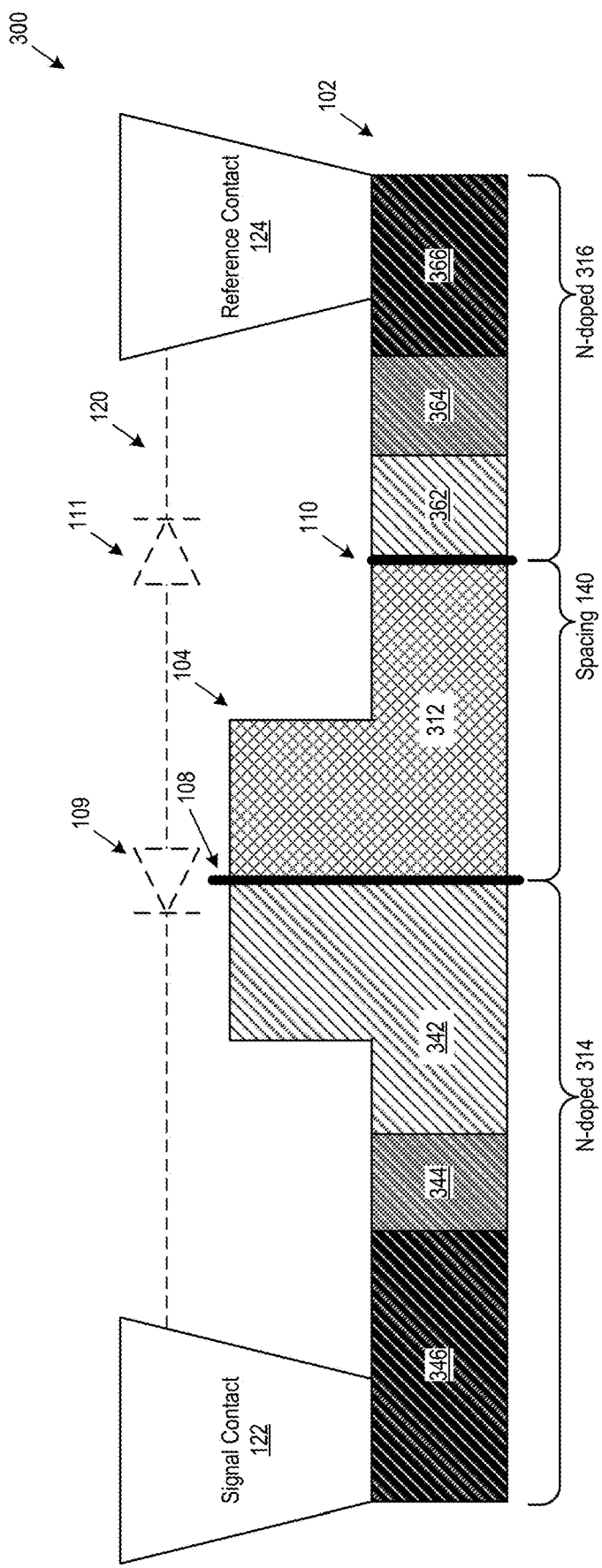
FIG. 3 shows an example cross-sectional view of a second example semiconductor based optical modulator.

FIG. 3 shows an example cross-sectional view of a second example semiconductor based optical modulator 300. In the second example semiconductor based optical modulator 300, the N-doped portions 314, 316 are divided into subportions 342, 344, 346, 362, 364, 366 with different dopant levels. In the example, the differing dopant levels are ordered such that dopant level increases with distance from the optical waveguide 104 and optical mode 106. Increased dopant levels increase free carrier levels (for a given level of carrier injection/depletion level). Free carriers contribute to linear optical absorption. Accordingly, in the example, sub-portions with higher dopant levels have higher light absorption. In the example, the sub-portions with the highest dopant levels 346, 366 are farthest from the optical waveguide 104. In the example, sub-portions with higher dopant levels have lower electrical resistance.

In various other implementations, P-doped portions, additionally or alternatively, are divided into sub-portions with different dopant levels to reduce the overall resistance of the P-doped portions.

In various other implementations, each portion has its sub-portions ordered separately from those of other portions. Accordingly, the sub-portions with the highest dopant levels within a given portion do not necessarily correspond to the highest dopant levels of sub-portions in other portions. Thus, in some cases, a sub-portion with a higher dopant level than another sub-portion in a different portion is closer to the optical waveguide 104 than that other sub-portion.

Figure 4:
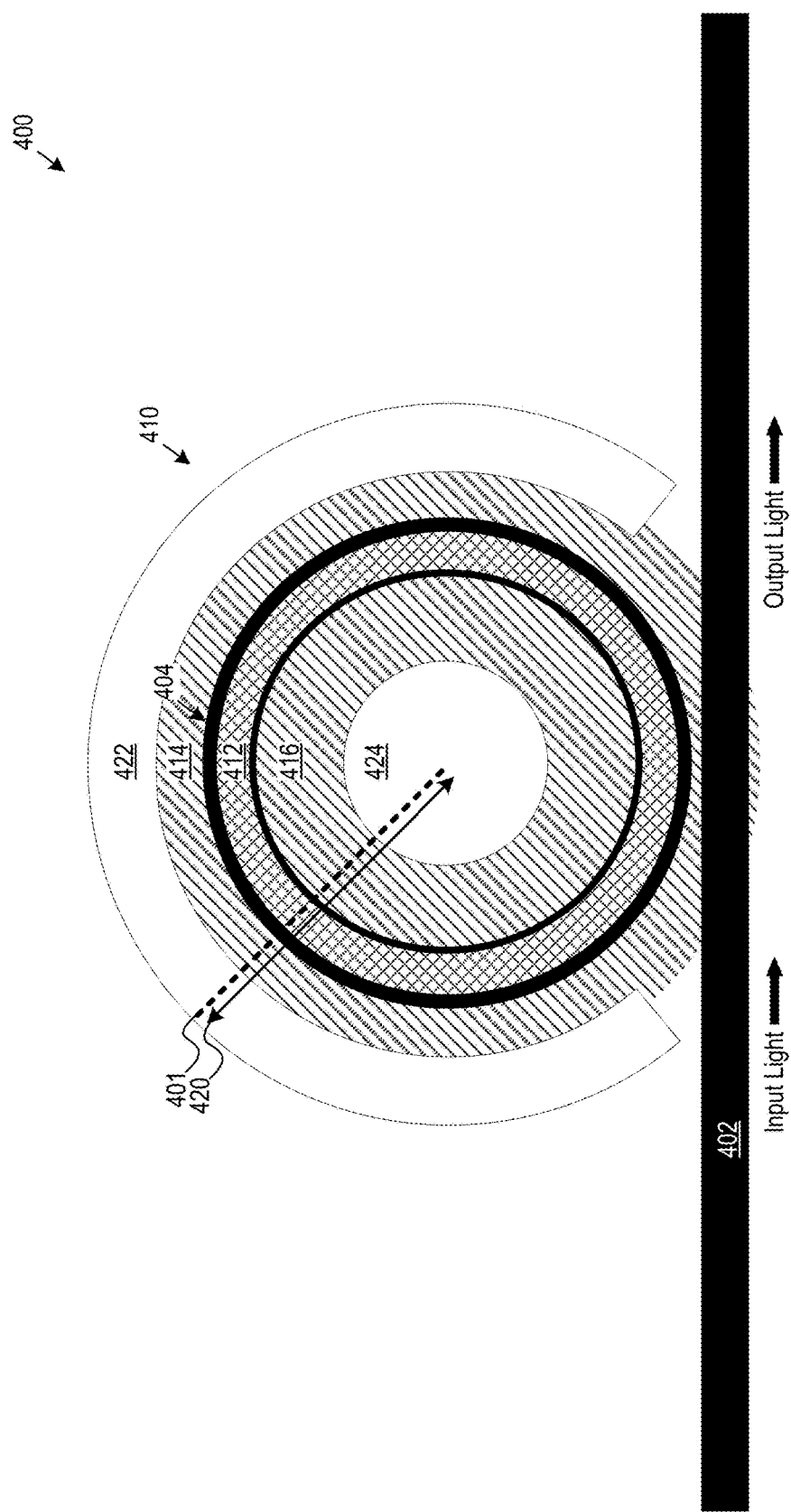
FIG. 4 shows the positioning of the example cross-section of FIG. 1 or 3 as implemented in an example semiconductor based ring modulator.

FIG. 4 shows a positioning 401 of the example cross-section of FIG. 1 or 3 as implemented in an example semiconductor based ring modulator 400. In the example, an input/output waveguide 402 is optically coupled to a resonator 410 forming a ring. The cross-sections of FIG. 1 or 3 correspond to a radial cross-section of the resonator 410, e.g., at position 401. N-doped portions 414, 416, a P-doped portion 412, and an optical waveguide 404 form (at least portions of) concentric annular regions making up the resonator 410. An electrical path 420 travels radially across the resonator 410 from a signal input contact 422 on an outer portion of the resonator 410 to a reference contact 424 at an inner portion of the resonator. Light circulating in the optical waveguide 404 is phase-shifted in accord with an RF signal applied at the signal input contact 422. The light circulating in the optical waveguide interferes with light traveling in the input/output waveguide 402 because, in the example, the coupling is bi-directional.

Figure 5:
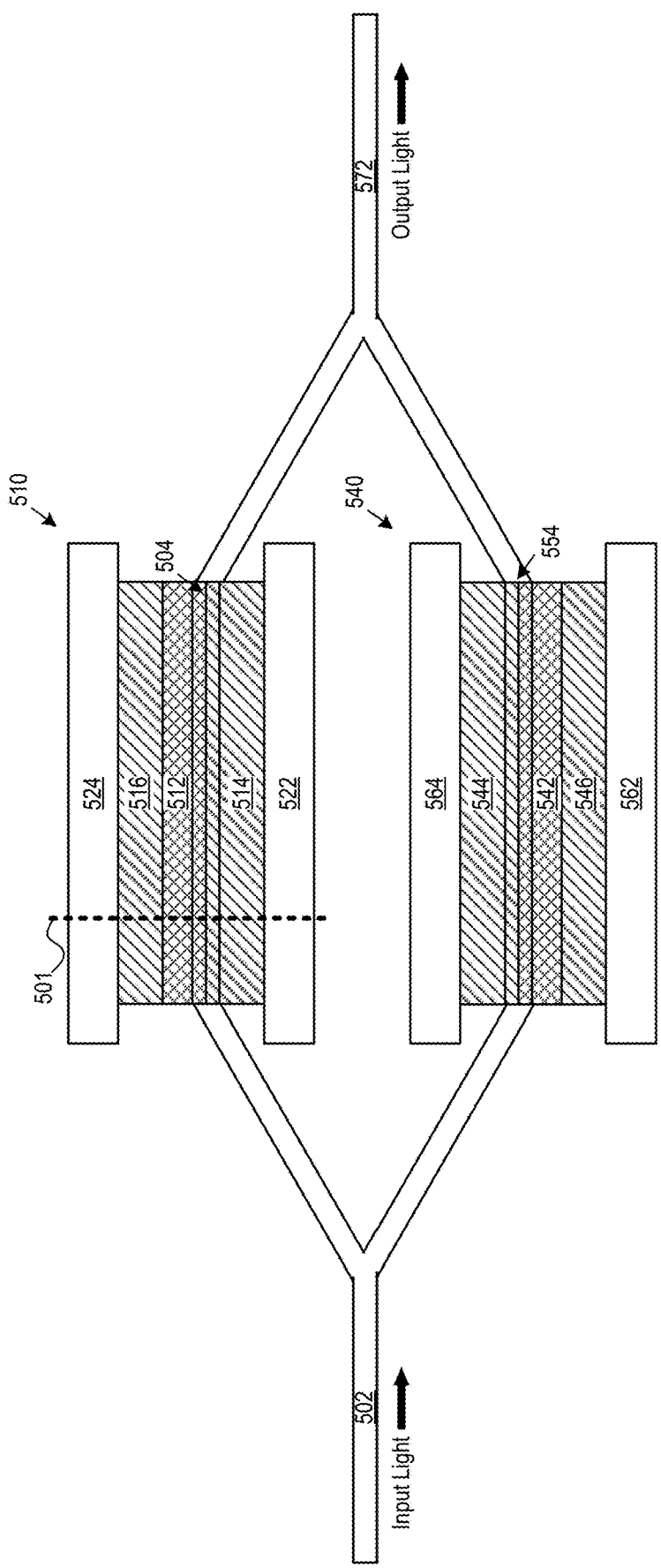
FIG. 5 shows the positioning of the example cross-section of FIG. 1 or 3 as implemented in an example semiconductor based Mach-Zehnder modulator.

FIG. 5 shows a positioning 501 of the example cross-section of FIG. 1 or 3 as implemented in an example semiconductor based MZM 500. In the example semiconductor based MZM 500, light is guided into the MZM 500 from an input waveguide 502. The light is split into two arms 510, 540 for interference and recombination at an output waveguide 572. The cross-sections of FIG. 1 or 3 correspond to cross sections of one or both of the arms 510, 540 of the example MZM 500 (e.g., at position 501). N-doped portions 514, 544, 516, 546, P-doped portions 512, 542, and optical waveguides 504, 554 extend along the arms 510, 540 of the MZM 500 between contacts 522, 524. For example, light on the first arm 510 undergoes a phase shift and then interferes with un-shifted light of the second arm 540 resulting in intensity modulation of recombined light at the output waveguide 572. In an example, light traveling on both arms 510, 540 is imparted with opposite phase shifts by applying the modulation signal additional across contacts 562, 564 (e.g., mirroring the physical layout of the arms 510, 540 such that the relative index shift is reversed with respect to the direction of travel of the optical mode). Accordingly, the degree of relative phase shift in the arms is doubled (e.g., a 90 degree phase shift on one arm corresponds to a 180 degree relative phase shift between the light in the respective the arms).

Figure 6:
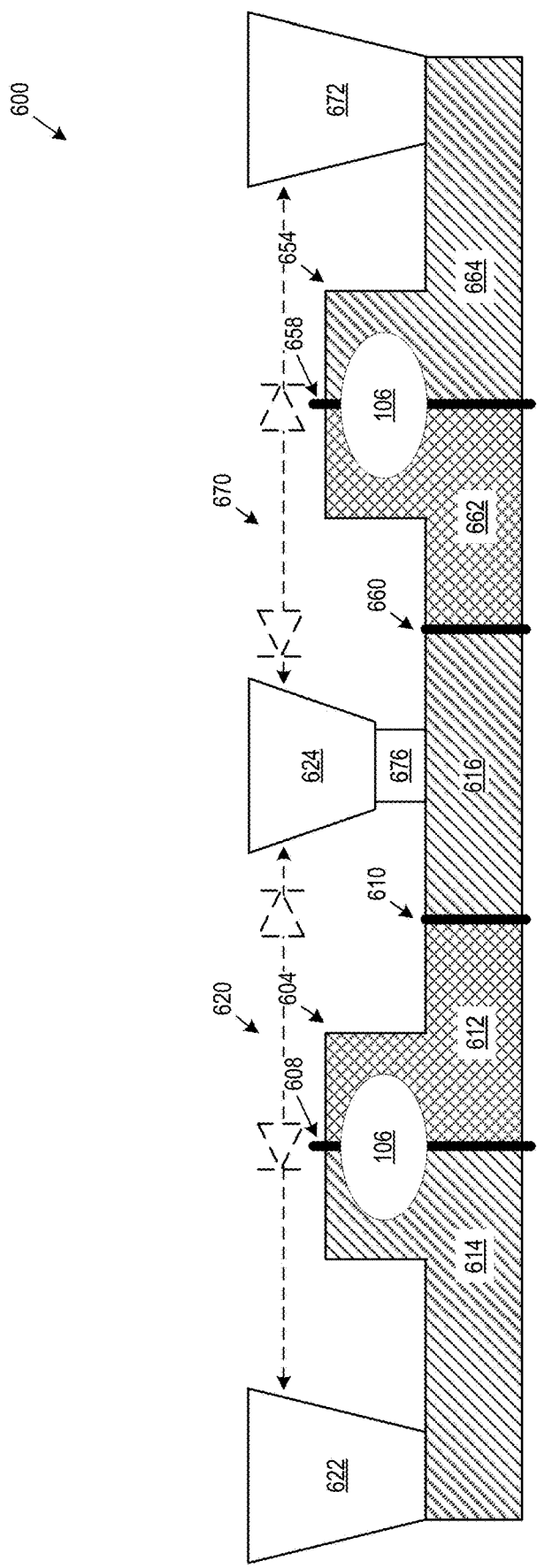
FIG. 6 shows a cross-sectional view of an example push-pull semiconductor based optical modulator.

FIG. 6 shows a cross-sectional view of an example push-pull semiconductor based optical modulator 600. The example push-pull semiconductor based optical modulator 600 includes two optical waveguides 604, 654. Accordingly, the push-pull semiconductor based optical modulator 600 is implemented, in various examples, as two arms of an MZM, e.g., the example MZM 500 of FIG. 5 or another suitable MZM.

The example push-pull semiconductor based optical modulator 600 includes, for each of the optical waveguides 604, 654, a respective on-path P-N junction 608, 658 and a respective off-path P-N junction 610, 660. The P-N junctions divide the push-pull semiconductor based optical modulator 600 into three N-doped portions 614, 616, 664 and two P-doped portions 612, 662 disposed on the semiconductor substrate 602.

A first electrical path 620 runs from a first signal contact 622 across a first optical waveguide 604 to the DC reference point 624. A second electrical path 670 runs from a second signal contact 672 across a second optical waveguide 654 to the DC reference point 624. In this example, the DC reference point includes a fixed DC contact 674 coupled to the N-doped portion 616 via an inductor 676. Accordingly, the first and second electrical paths 620, 670 are allowed a level of electrical crosstalk that is defined by the inductance of inductor 676. When complementary RF signals (e.g., in phase or 180 degrees out of phase depending on operation) are provided simultaneously to the first 622 and second 672 contacts, the electrical crosstalk provides constructive interference leading to increased efficiency in operation (e.g., a reduction in the signal voltage level used to obtain a 180 degree relative phase shift between the light in the two waveguides 604, 654) of the push-pull semiconductor based optical modulator 600 relative to no-crosstalk-allowed operation.

Figure 7:
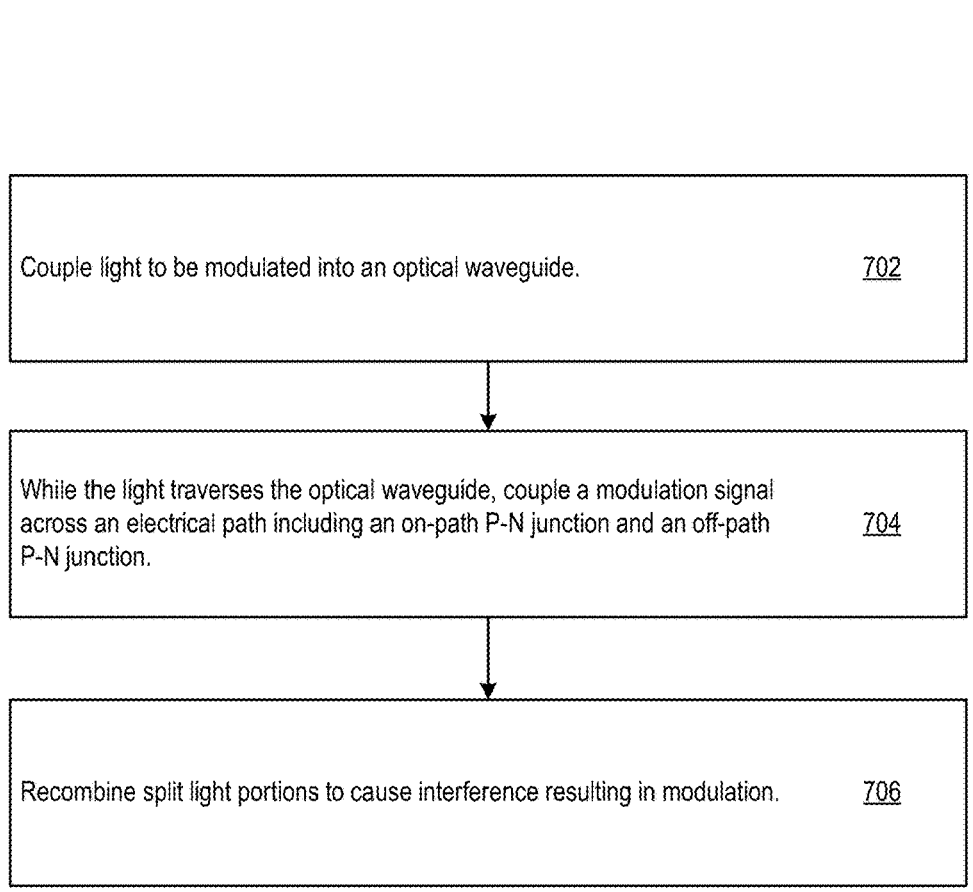
FIG. 7 shows an example method of operation for an example semiconductor based optical modulator.

FIG. 7 shows an example method of operation 700 for an example semiconductor based optical modulator. The method of operation 700 is implemented by any of the example optical modulators discussed above with reference to FIGS. 1-6, or another suitable optical modulator.

Light to be modulated is optically coupled into an optical waveguide (702). In various implementations, an illumination source, such as a continuous wave laser tuned to a communication band or coherent illumination source, provides the light to be modulated. In various implementations, the coupling of the light into the optical waveguide includes splitting the provided coherent illumination (e.g., by coupling into a resonator (such as the resonator 410 of the example ring modulator 400 of FIG. 4) or an arm of an MZM (such as the arm 510 or the arm 540 of the MZM 500 of FIG. 5).

While the light traverses the optical waveguide, a modulation signal is electrically coupled across an electrical path including an on-path P-N junction coincident with the optical waveguide and an off-path P-N junction space apart from the optical waveguide (704). The modulation signal (such as an RF signal) causes a relative refractive index shift between the P-doped and N-doped portions that meet at the on-path P-N junction. The relative refractive index shift causes a phase shift in the light as the light traverses the optical waveguide. In various implementations, electrically coupling the modulation signal includes electrically coupling the modulation signal to one or more contacts at the ends of the electrical path.

After traversing the optical waveguide, the split portions of the light are recombined (706) to cause interference that results in the output light having intensity profile that is dependent on the modulation signal.

Figure 8:
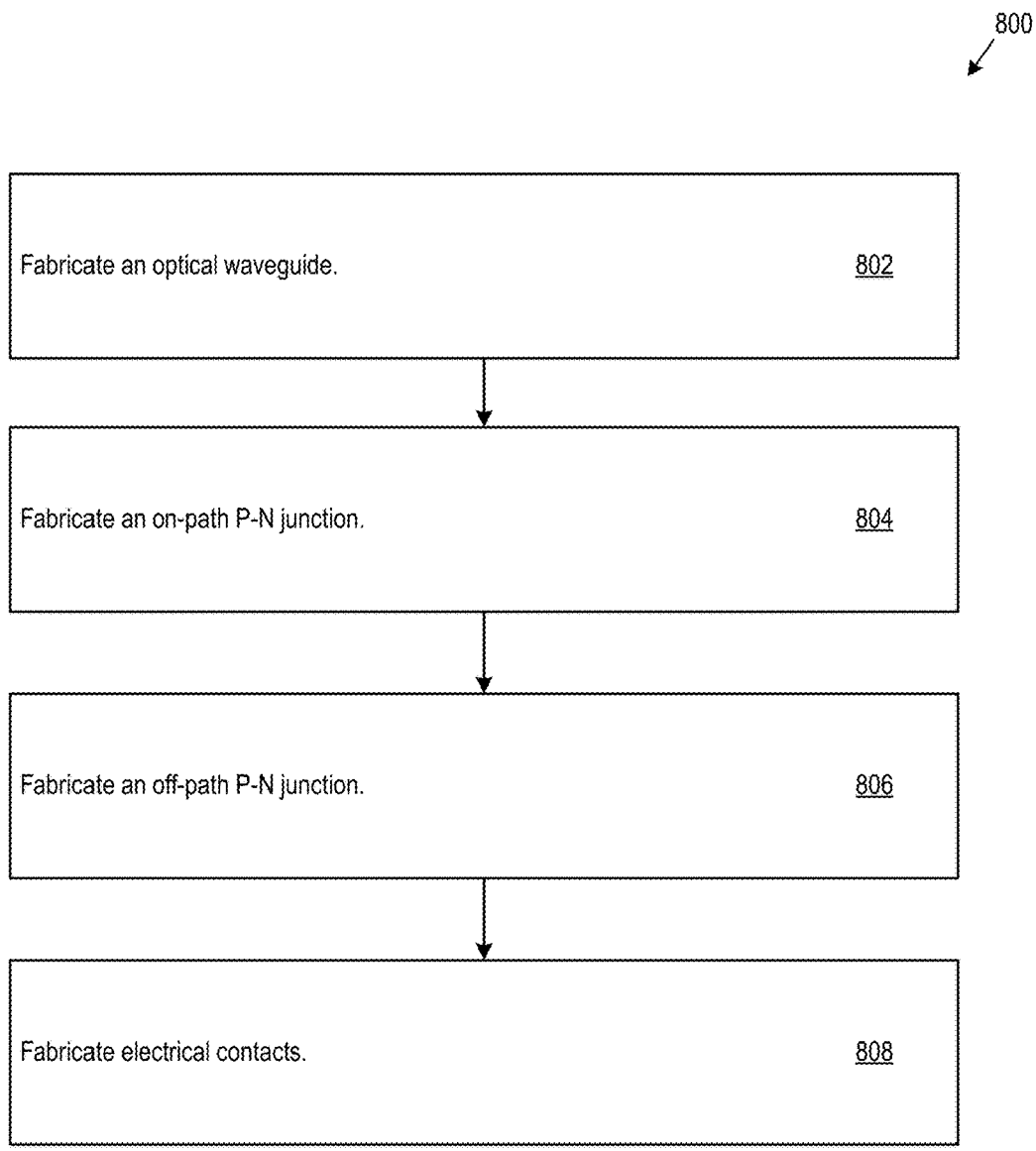
FIG. 8 shows an example method of manufacture for an example semiconductor based optical modulator.

FIG. 8 shows an example method of manufacture 800 for an example semiconductor based optical modulator. The method of manufacture 800 is implemented to manufacture any of the example optical modulators discussed above with reference to FIGS. 1-6, or another suitable optical modulator. In other examples, any of the example optical modulators discussed above with reference to FIGS. 1-6 are manufactured according to another suitable method of manufacture different than the method of manufacture 800.

An optical waveguide is fabricated on a semiconductor substrate (802). In various implementations, the optical waveguide includes a region of high refractive index surrounded by lower refractive index material. For example, the waveguide includes a raised channel or ridge of comparatively higher index material (such as silicon, doped silicon, or other comparatively higher index material) surrounded on one or more sides by a material of comparatively lower index material (e.g., such as air, silicon dioxide, or other comparatively lower index material).

An on-path P-N junction is fabricated on the semiconductor substrate (804) and an off-path P-N junction is fabricated on the semiconductor substrate (806). In various implementations, the fabrication of the P-N junctions includes fabrication of P-doped and N-doped portions on the substrate with the P-N junctions defining the borders between the P- and N-doped portions.

In some cases, the P-doped portions and the N-doped portions are fabricated prior to fabrication of the waveguide. For example, in some cases, the P- and N-doped portions are fabricated by applying a mask, diffusing a first one of the P-dopants and the N-dopants into the masked substrate, removing the mask and applying a compliment mask, and diffusing the other of the P-dopants and the N-dopants into the complimentarily masked substrate, removing the compliment mask, applying a mask over the optical waveguide, and etching the substrate around the waveguide to form a raised ridge. However, other implementations use other suitable fabrication techniques. For example, in some cases, either or both of the P-dopants and the N-dopants are diffused in multiple cycles of masking and diffusion to create sub-portions with differing dopant levels.

Electrical contacts are fabricated on the substrate (808). In various implementations, metal contacts are added to support application of the modulation signal across the electrical path created by the P-doped and the N-doped portions on the substrate. In some cases, the metal contacts are applied in multiple layers. For example, in some cases, vias are formed in contact with the substrate which is then covered in an intermediate layer (such as an oxide layer). The vias extend through the intermediate layer to connect with metal contacts fabricated on top of the intermediate layer.

Figure 9:
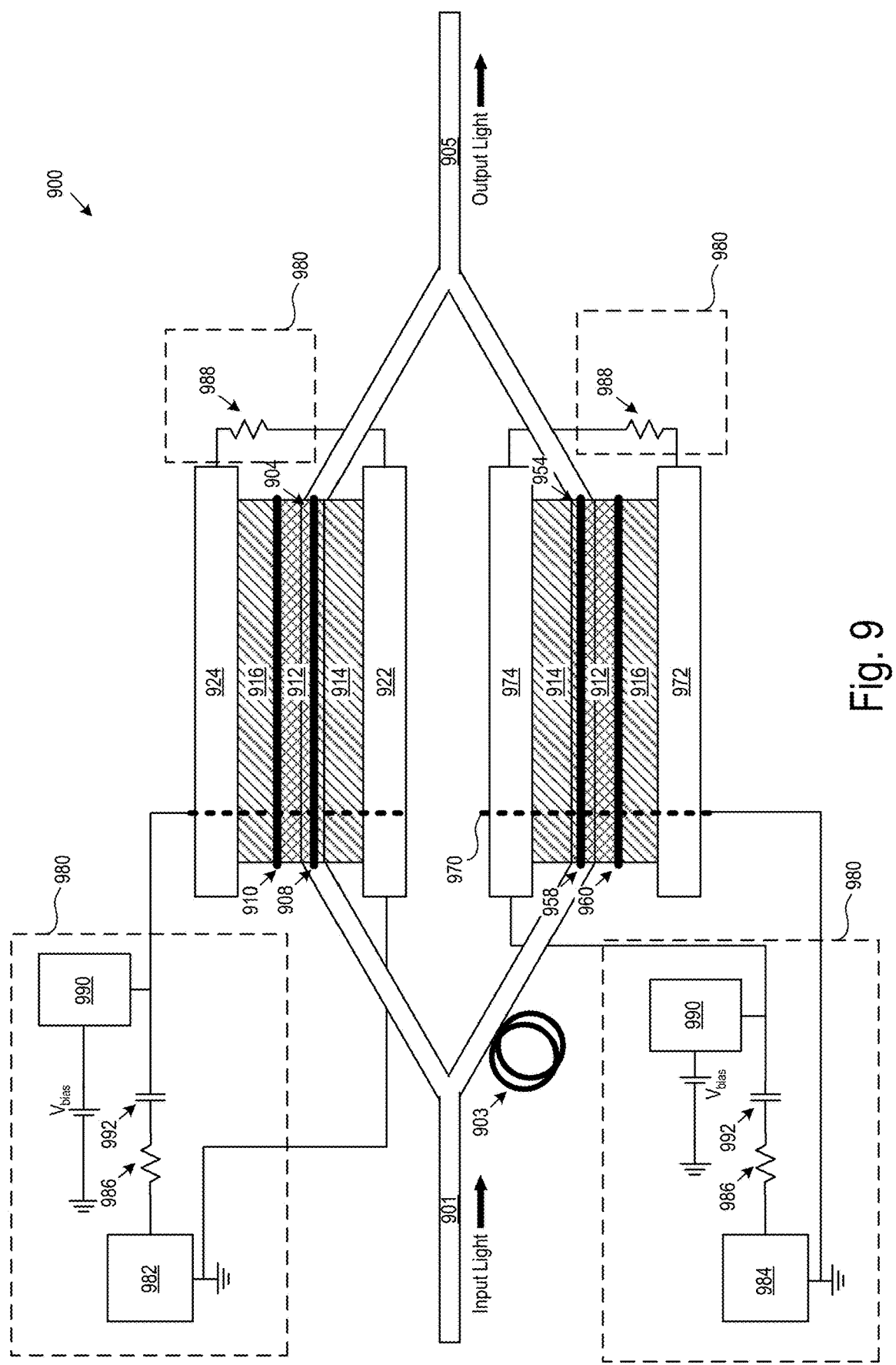
FIG. 9 shows an example Mach-Zehnder modulator.

FIG. 9 shows another example MZM 900. The example MZM includes example RF signal supply circuitry 980, optical waveguides 904, 954, an optical input 901, an optical delay 903, an optical output 905, N-doped regions 914, 916, 964, 966, P-doped regions 912, 914, on-path P-N junctions 908, 958, and off-path P-N junctions 910, 960. The example RF signal supply circuitry 980 supplies RF signals across the electrical paths 920, 970 from the signal supply contacts 922, 972 to the bias contacts 924, 974. The example RF signal supply circuitry 980 includes RF sources 982, 984, input resistance 986, termination resistance 988, and inductance 990 and capacitance 992 for application of the bias (e.g., a DC reference). The supply of the RF signals across the electrical paths causes opposing phase shifts in the optical waveguides 904, 954 leading to interference upon recombination at the optical output 905. The optical delay 903 is selected to control the relative phase (before shifting) of the two arms. For example, in some cases, optical delay 903 is selected such that light in the arms is initially 180 degrees out of phase resulting in destructive interference in the absence of relative phase shifting in the optical waveguides 904, 954. In some cases, optical delay 903 is selected such that light in the arms is initially in phase resulting in constructive interference in the absence of relative phase shifting in the optical waveguides 904, 954.

In various implementations, the example RF signal supply circuitry 980 is used with the example modulators of any of FIGS. 1 and 3-6. However, in various other implementations, including those using the structures of any of FIGS. 1 and 3-6, other suitable signal supply circuitry is used.

For the example MZM 900, the method 700 of FIG. 7 is used to operate the MZM 900. However, in various other implementations including those using the structure of the example MZM 900, other suitable methods of operation are used.

For the example MZM 900, the method 800 of FIG. 8 is used to fabricate the MZM 900. However, in various other implementations including those using the structure of the example MZM 900, other suitable methods of fabrication are used.

Various example implementations have been included for illustration. Other implementations are possible.

Table 2 includes various examples.

TABLE 2

| Examples |
|---|
| E1. An optical modulator, including: a semiconductor substrate; an optical waveguide portion disposed on the semiconductor substrate, the optical waveguide portion configured to provide an optical path for light that is to be modulated; a first P-N junction disposed on the semiconductor substrate along the optical path, the first P-N junction defining a border between an N-doped portion disposed on the semiconductor substrate and a P-doped portion disposed on the semiconductor substrate; and a second P-N junction disposed on a portion of the semiconductor substrate alongside the optical path and spaced apart from the first P-N junction, wherein: optionally, the optical modulator is in accord and/or implemented in accord with any other example in this table. |
| E2. The optical modulator of any other example in this table, wherein the first P-N junction and the second P-N junction are electrically coupled in series along an electrical path transverse to the optical path. |
| E3. The optical modulator of any other example in this table, wherein the N-doped portion and the P-doped portion are configured to undergo a shift in refractive index relative to one another while an electrical potential is applied across the first P-N junction. |
| E4. The optical modulator of any other example in this table, wherein: the optical modulator is structured as a ring modulator including a resonator portion forming a ring.; and |

TABLE 2-continued

Examples the optical waveguide portion, N-doped portion, and P-doped portion include at least parts of concentric annular regions of the resonator portion.
E5. The optical modulator of any other example in this table, wherein:
the optical waveguide portion, the first P-N junction, and the second P-N junction are components of a Mach-Zehnder modulator; and
the optical waveguide forms an arm of the Mach-Zehnder modulator.
E6. The optical modulator of any other example in this table, wherein the second P-N junction defines a border between either the N-doped portion or the P-doped portion and an opposingly-doped portion disposed on the semiconductor substrate.
E7. The optical modulator of example E6 or any other example in this table, wherein the N-doped portion, the P-doped portion and/or the opposingly-doped portion include sub-portions with differing dopant levels.
E8. The optical modulator of example E7 or any other example in this table, wherein, separately in each of the N-doped, the P-doped and the opposingly-doped portions, any sub-portions are ordered such that sub-portion dopant level increases with increasing distance from the optical path.
E9. The optical modulator of example E6 or any other example in this table, wherein:
the opposingly-doped portion includes a second P-doped portion; and
the second P-N junction defines a border between the N-doped portion and the second P-doped portion.
E10. The optical modulator of example E6 or any other example in this table, wherein:
the opposingly-doped portion includes a second N-doped portion; and
the second P-N junction defines a border between the P-doped portion and the second N-doped portion.
E11. The optical modulator of any other example in this table, wherein a distance between the first and second P-N junctions is selected based on a size of an optical mode the optical waveguide portion is configured to guide.
E12. The optical modulator of example E11 or any other example in this table, wherein the distance is further selected based on a ratio between an expected optical loss from interference with the optical mode by the second P-N junction and expected electrical loss due to resistivity of a portion of the semiconductor substrate between the first and second P-N junctions.
E13. The optical modulator of any other example in this table, further including:
a first metal contact disposed on the semiconductor substrate alongside the first P-N junction, the first metal contact configured to receive, via electrical coupling, a modulation signal; and
a reference point disposed on the semiconductor substrate alongside the first P-N junction, the reference point electrically coupled to the first metal contact in series through the first and second P-N junctions, the reference point contact configured to be held at, via electrical coupling, a DC reference potential.
E14. The optical modulator of example E13 or any other example in this table, wherein the reference point includes a second metal contact disposed on the semiconductor substrate alongside the first P-N junction.
E15. The optical modulator of any other example in this table, further including:
a second optical waveguide portion disposed on the semiconductor substrate, the second optical waveguide portion configured to provide a second optical path for light that is to be modulated;
a third P-N junction disposed on the semiconductor substrate along the second optical path; and
a fourth P-N junction disposed on a portion of the semiconductor substrate alongside the second optical path and spaced apart from the third P-N junction; and
a refence point disposed on the semiconductor substrate between the two optical waveguide portions, refence point configured to be held at, via electrical coupling, a DC reference potential.
E16. The optical modulator of any other example in this table, wherein the first P-N junction is disposed on the semiconductor substrate to bisect the optical waveguide portion.
E17. A method of optical modulation, including:
optically coupling light to be modulated onto an optical path provided by an optical waveguide portion disposed on a semiconductor substrate; and
electrically coupling a modulation signal along an electrical path by:
electrically coupling across a first P-N junction disposed on the semiconductor substrate along the optical path and that defines a border between a N-doped portion disposed on the semiconductor substrate and a P-doped portion disposed on the semiconductor substrate; and
electrically coupling across a second P-N junction disposed on the semiconductor substrate alongside the optical path and spaced apart from the first P-N junction, wherein:
optionally, the method is implemented using an optical modulator in accord with any other example in this table.
E18. The method of optical modulation of any example in this table, wherein electrically coupling the modulation signal along the electrical path includes:
electrically coupling the modulation signal from a first metal contact to a second metal contact in series through the first and second P-N junctions; and
holding the second metal contact at a DC reference potential.

TABLE 2-continued

Examples

E19. The method of optical modulation of any example in this table, further including modulating the light by causing the N-doped and P-doped portions to shift in refractive index relative to one another responsive to an electrical potential of the modulation signal.
E20. The method of optical modulation of any example in this table, wherein electrically coupling across the second P-N junction includes electrically coupling the modulation signal across a border between either the N-doped portion or the P-doped portion and an opposingly-doped portion disposed on the semiconductor substrate.
E21. A method of manufacturing an optical modulator, including:
providing a semiconductor substrate;
fabricating an optical waveguide portion disposed on the semiconductor substrate, the optical waveguide portion configured to provide an optical path for light that is to be modulated;
fabricating a first P-N junction disposed on the semiconductor substrate along the optical path, the first P-N junction defining a border between an N-doped portion disposed on the semiconductor substrate and a P-doped portion disposed on the semiconductor substrate; and
fabricating a second P-N junction disposed on a portion of the semiconductor substrate alongside the optical path and spaced apart from the first P-N junction, wherein:
optionally, the method is used to fabricate an optical modulator in accord with any other example in this table.
E22. The method of fabrication of an optical modulator of any example in this table, further including fabricating metal contacts on the semiconductor substrate to define an electrical path across the first and second P-N junctions.
E23. The method of fabrication of an optical modulator of example E22 or any other example in this table, wherein fabricating the N-doped portion, the P-doped portion and/or the opposingly-doped portion includes fabricating sub-portions with differing dopant levels.
E24. The method of fabrication of an optical modulator of any example in this table, where:
fabricating the optical modulator includes fabricating a ring modulator including a resonator forming a ring; and
fabricating the resonator includes fabricating concentric annular regions forming the optical waveguide portion, the N-doped portion, and the P-doped portion.
E25. The method of fabrication of an optical modulator of any example in this table, where:
fabricating the optical modulator includes fabricating a Mach-Zehnder modulator; and
fabricating an arm of the Mach-Zehnder modulator includes fabricating the optical waveguide portion, the N-doped portion, and the P-doped portion.
E26. A method of optical modulation including implementing the optical modulator of any example in this table.
E27. A method of manufacture including fabricating the optical modulator of any example in this table.
E28. The optical modulator of any other example in this table, where the first P-N junction and the second P-N junction are laterally spaced apart.
E29. The optical modulator of any other example in this table, where the first P-N junction and the second P-N junction are spatially oriented in the same direction with respect to the semiconductor substrate.
E30. The optical modulator of example E6 or any other example in this table, where:
either the N-doped portion or the P-doped portion separate the other of the N-doped portion or the P-doped portion and the opposingly-doped portion; and
the other of the N-doped portion or the P-doped portion and the opposingly-doped portion are non-contiguous, where
optionally, the either of the N-doped portion or the P-doped portion provides electrical coupling between other of the N-doped portion or the P-doped portion and the opposingly-doped portion.

The present disclosure has been described with reference to specific examples that are intended to be illustrative only and not to be limiting of the disclosure. Changes, additions and/or deletions may be made to the examples without departing from the spirit and scope of the disclosure.

The foregoing description is given for clearness of understanding only.

What is claimed is:
1. An optical modulator, including:
a semiconductor substrate;
an optical waveguide portion disposed on the semiconductor substrate, the optical waveguide portion configured to provide an optical path for light that is to be modulated;
a first P-N junction disposed on the semiconductor substrate along the optical path, the first P-N junction defining a border between an N-doped portion disposed on the semiconductor substrate and a P-doped portion disposed on the semiconductor substrate, the P-doped portion having a uniform doping level; and
a second P-N junction disposed on a portion of the semiconductor substrate alongside the optical path and spaced apart from the first P-N junction by the P-doped portion, the P-doped portion extending from the first P-N junction to the second P-N junction; and
a reference point disposed on the semiconductor substrate alongside the first P-N junction, the reference point electrically coupled in series with the first P-N junction and the second P-N junction, the reference point configured to be held at, via electrical coupling, a DC reference potential.

2. The optical modulator of claim 1, wherein the first P-N junction and the second P-N junction are electrically coupled in series along an electrical path transverse to the optical path.

3. The optical modulator of claim 1, wherein the N-doped portion and the P-doped portion are configured to undergo a shift in refractive index relative to one another while an electrical potential is applied across the first P-N junction.

4. The optical modulator of claim 1, wherein:
the optical modulator is structured as a ring modulator including a resonator portion forming a ring; and
the optical waveguide portion, N-doped portion, and P-doped portion include at least parts of concentric annular regions of the resonator portion.

5. The optical modulator of claim 1, wherein:
the optical waveguide portion, the first P-N junction, and the second P-N junction are components of a Mach-Zehnder modulator; and
the optical waveguide forms an arm of the Mach-Zehnder modulator.

6. The optical modulator of claim 1, wherein the second P-N junction defines a border between the P-doped portion and an opposingly-doped portion disposed on the semiconductor substrate.

7. The optical modulator of claim 6, wherein the N-doped portion and/or the opposingly-doped portion include sub-portions with differing dopant levels.

8. The optical modulator of claim 7, wherein, separately in each of the N-doped and the opposingly-doped portions, any sub-portions are ordered such that sub-portion dopant level increases with increasing distance from the optical path.

9. The optical modulator of claim 6, wherein:
the opposingly-doped portion includes a second N-doped portion; and
the second P-N junction defines a border between the P-doped portion and the second N-doped portion.

10. The optical modulator of claim 1, wherein a distance between the first and second P-N junctions is selected based on a size of an optical mode the optical waveguide portion is configured to guide.

11. The optical modulator of claim 10, wherein the distance is further selected based on a ratio between an expected optical loss from interference with the optical mode by the second P-N junction and expected electrical loss due to resistivity of a portion of the semiconductor substrate between the first and second P-N junctions.

12. The optical modulator of claim 1, further including:
a first metal contact disposed on the semiconductor substrate alongside the first P-N junction, the first metal contact configured to receive, via electrical coupling, a modulation signal;
wherein the reference point is electrically coupled to the first metal contact in series through the first and second P-N junctions.

13. The optical modulator of claim 12, wherein the reference point includes a second metal contact disposed on the semiconductor substrate alongside the first P-N junction.

14. The optical modulator of claim 1, further including:
a second optical waveguide portion disposed on the semiconductor substrate, the second optical waveguide portion configured to provide a second optical path for light that is to be modulated;
a third P-N junction disposed on the semiconductor substrate along the second optical path; and
a fourth P-N junction disposed on a portion of the semiconductor substrate alongside the second optical path and spaced apart from the third P-N junction; and
wherein the reference point is disposed on the semiconductor substrate between the two optical waveguide portions.

15. The optical modulator of claim 1, wherein the first P-N junction is disposed on the semiconductor substrate to bisect the optical waveguide portion.

16. The optical modulator of claim 1, where the first P-N junction and the second P-N junction are laterally spaced apart.

17. The optical modulator of claim 1, where the first P-N junction and the second P-N junction are spatially oriented in a same direction with respect to the semiconductor substrate.

18. A method of optical modulation, including:
optically coupling light to be modulated onto an optical path provided by an optical waveguide portion disposed on a semiconductor substrate; and
electrically coupling a modulation signal along an electrical path by:
electrically coupling across a first P-N junction disposed on the semiconductor substrate along the optical path and that defines a border between i) a first N-doped portion disposed on the semiconductor substrate and ii) a P-doped portion disposed on the semiconductor substrate, the P-doped portion having a uniform doping level; and
electrically coupling across a second P-N junction disposed on the semiconductor substrate alongside the optical path and spaced apart from the first P-N junction, the second P-N junction defining a border between i) a second N-doped portion disposed on the semiconductor substrate and ii) the P-doped portion;
holding a reference point at a DC reference potential via electrical coupling, the reference point i) disposed on the semiconductor substrate alongside the first P-N junction and ii) electrically coupled in series with the first P-N junction and the second P-N junction.

19. The method of optical modulation of claim 18, wherein electrically coupling the modulation signal along the electrical path includes:
electrically coupling the modulation signal from a first metal contact to a second metal contact of the reference point in series through the first and second P-N junctions; and
wherein holding the reference point at the DC reference potential comprises holding the second metal contact at the DC reference potential.

20. The method of optical modulation of claim 18, further including modulating the light by causing the N-doped and P-doped portions to shift in refractive index relative to one another responsive to an electrical potential of the modulation signal.

21. The method of optical modulation of claim 18, wherein electrically coupling across the second P-N junction includes electrically coupling the modulation signal across a border between the P-doped portion and the second N-doped portion.

22. A method of manufacturing an optical modulator, including:
    providing a semiconductor substrate;
    fabricating an optical waveguide portion disposed on the semiconductor substrate, the optical waveguide portion configured to provide an optical path for light that is to be modulated;
    fabricating a first P-N junction disposed on the semiconductor substrate along the optical path, the first P-N junction defining a border between i) a first N-doped portion disposed on the semiconductor substrate and ii) a P-doped portion disposed on the semiconductor substrate, the P-doped portion having a uniform doping level; and
    fabricating a second P-N junction disposed on a portion of the semiconductor substrate alongside the optical path and spaced apart from the first P-N junction, the second P-N junction defining a border between i) a second N-doped portion disposed on the semiconductor substrate and ii) the P-doped portion; and
    fabricating a reference point disposed on the semiconductor substrate alongside the first P-N junction, including fabricating the reference point to be electrically coupled in series with the first P-N junction and the second P-N junction, the reference point to be held at, via electrical coupling, a DC reference potential.

23. The method of manufacturing the optical modulator of claim 22, wherein fabricating the first P-N junction and fabricating the second P-N junction are part of forming an electrical path having i) a first portion within the first N-doped region from a signal contact to the first P-N junction, and ii) a second portion within the P-doped region from the first P-N junction to the second P-N junction, the second portion of the electrical path having a second length shorter than a first length of the first portion of the electrical path.

24. The method of optical modulation of claim 18, wherein electrically coupling the modulation signal along the electrical path further includes:
    electrically coupling via a first portion of the electrical path within the first N-doped region from a signal contact to the first P-N junction; and
    electrically coupling via a second portion of the electrical path within the P-doped region from the first P-N junction to the second P-N junction, the second portion of the electrical path having a second length shorter than a first length of the first portion of the electrical path.

25. The optical modulator of claim 1, wherein the second P-N junction is electrically coupled in series along an electrical path having i) a first portion within the N-doped region from a signal contact to the first P-N junction, and ii) a second portion within the P-doped region from the first P-N junction to the second P-N junction, the second portion of the electrical path having a second length shorter than a first length of the first portion of the electrical path.

* * * * *